United States Patent [19]
Lopez et al.

[11] Patent Number: 5,654,879
[45] Date of Patent: Aug. 5, 1997

[54] MULTI-OUTPUT DC/DC POWER CONVERTER

[75] Inventors: Manuel Vazquez Lopez, Tres Cantos; Enrique De La Cruz Moreno; Salvador Ollero Velasco, both of Madrid, all of Spain

[73] Assignee: Alcatel N.V., Rijswijk, Netherlands

[21] Appl. No.: 580,350

[22] Filed: Dec. 28, 1995

[30] Foreign Application Priority Data

Dec. 30, 1994 [ES] Spain ..................... 9402694

[51] Int. Cl.⁶ .......................................... H02M 3/335
[52] U.S. Cl. ................................... 363/16; 363/21
[58] Field of Search ........................... 363/16, 21, 17, 363/71, 97, 132

[56] References Cited

U.S. PATENT DOCUMENTS

| | | |
|---|---|---|
| 4,455,596 | 6/1984 | Baker . |
| 5,448,465 | 9/1995 | Yoshida et al. ................ 363/16 |
| 5,541,828 | 7/1996 | Rozman ........................ 363/21 |
| 5,544,032 | 8/1996 | Mimura ........................ 363/16 |

FOREIGN PATENT DOCUMENTS

| | | |
|---|---|---|
| 0474471 | 3/1992 | European Pat. Off. . |
| 3912849 | 11/1989 | Germany . |

OTHER PUBLICATIONS

"An Alternative Method for Controlling Two–Output DC–To–DC Converters Using Saturable Core Inductors", PESC 1990, by J. Sebastian, J. Blanco, J. Uceda, A. Lumbreras and F. Canizales (CH2873–8/90/0000–0043).
Proceedings of the Annual Power Electronics Specialists Conference (PESC), San Antonio, Jun. 11–14, 1990, vol. 1, Jun. 11, 1990, Institute of Electrical and Electronics Engineers, pp. 43–50, XP000173907, Sebastian J. et al: "An Alternative Method for Controlling Two–Output DC–to–DC Converters Using Saturable Core Inductor".

*Primary Examiner*—Stuart N. Hecker
*Attorney, Agent, or Firm*—Frishauf, Holtz, Goodman, Langer & Chick

[57] ABSTRACT

A converter device that transforms an input voltage (VE) into several output voltages (V1, . . . ,VN) includes a transformer (T), a first switching control device (PWM) that generates a first switching control signal (Q1) to control the switching of a first switching element (M1) and thereby regulate a main output of the converter, and a second switching control device (SDCC) that generates a second switching control signal (Q2) which is a function of both the first switching control signal (Q1) and of a second output voltage (V2). This second switching control signal (Q2) controls the switching of a second switching device (SDC) in order to regulate a second output voltage of the converter device.

6 Claims, 2 Drawing Sheets

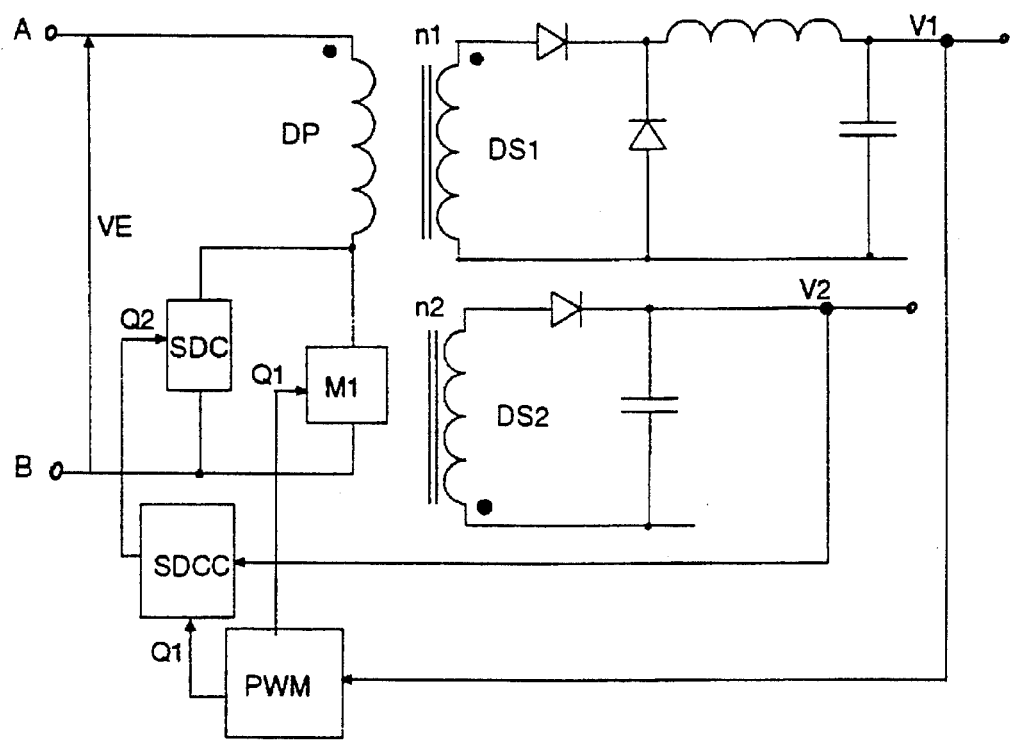
FIG. 3
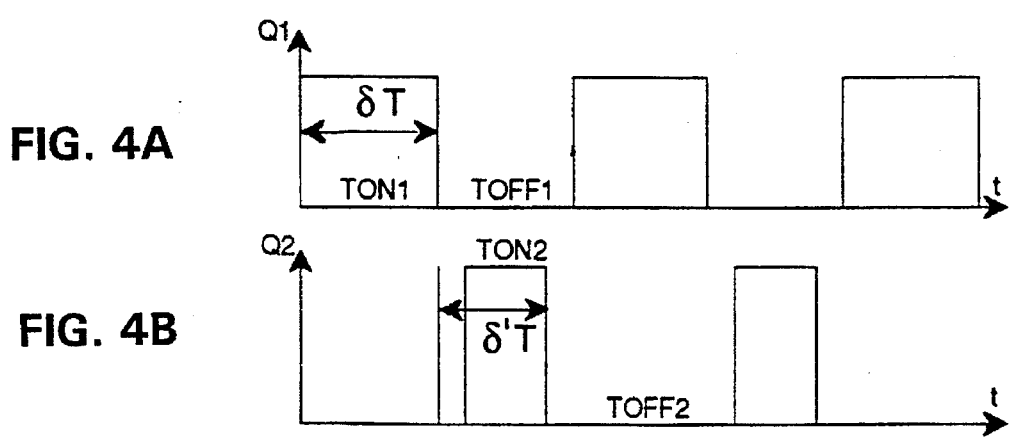
FIG. 4A
FIG. 4B

MULTI-OUTPUT DC/DC POWER CONVERTER

BACKGROUND OF THE INVENTION

1. Field of the Invention

This invention concerns a power converter device that transforms a direct current input voltage into several outputs. This multi-output converter provides a regulated main output and also regulates one of a plurality of auxiliary outputs and is of special application in equipment that requires more than one regulated direct-current power supply voltage.

2. Description of the Prior Art

The article by J. Sebastian, J. Blanco, J. Uceda, A. Lumbreras and F. Cañizales, "AN ALTERNATIVE METHOD FOR CONTROLLING TWO-OUTPUT DC-TO-DC CONVERTERS USING SATURABLE CORE INDUCTORS", PESC 1990, shows the regulation of two outputs of a converter using a single switching element and a saturable core inductor, as illustrated in FIG. 11b of the article mentioned.

The regulation of the two converter outputs is achieved by modulation of the switching frequency and of a pulse width of a duty cycle of a MOSFET.

The main output is regulated by means of the pulse width of the duty cycle of the MOSFET and the auxiliary output is regulated by the switching frequency of the MOSFET in question. Nevertheless, when oscillations occur in the auxiliary output load, it is accompanied by a variation in the switching frequency.

The switching frequency varies by a percentage of the oscillation in the load connected to the auxilliary output. The drawbacks resulting from variations in switching frequency reside in the greater size required of the magnetic components, such as a transformer and inductors, for the lowest switching frequency. Other parts of the converter that are also penalized in the design process are electromagnetic interference filters since the switching frequency moves over a broad range, meaning that the design of these filters is of greater complexity.

Similarly the efficiency of the converter is also affected as switching losses in the MOSFET and in the magnetic circuit of the transformer are proportional to the switching frequency, making the losses increase and the efficiency fall.

SUMMARY

Thus, an object of the invention is to provide a multi-output converter that regulates a number of outputs and works at a fixed switching frequency with no increase in converter losses or in the number of components, thereby reducing the size and cost of the converter.

It is another object of the present invention to provide a multi-output DC/DC converter which has two of its outputs regulated and eliminates the problems caused by variations in the switching frequency.

To achieve this object, the multi-output DC/DC converter of the invention additionally includes a second switching element, a MOSFET, which is used to regulate the voltage of an auxiliary output instead of using the switching frequency.

It is another object of the present invention to provide a converter which transfers the energy in a primary winding into a secondary winding during the conductive period of a first MOSFET switching element. This secondary winding comprises the converter main output, forward PWM topology, while the other secondary windings comprise the converter auxiliary outputs.

It is another object of the present invention to provide a converter having an auxiliary output which is regulated and which, includes a secondary winding which during a conductive period of a second MOSFET releases the energy stored in the transformer during the conductive period of the first MOSFET, flyback topology, and works in a discontinuous mode, that is, the current in the secondary winding attains zero value during part of the cut-off period of the first MOSFET.

It is a feature of the present invention to control a time in which the energy stored in the transformer is released through the secondary winding and, the voltage of an auxiliary output is regulated. This last feature is achieved by controlling the pulse width of the duty cycle of the second MOSFET.

Consequently, the regulated auxiliary output voltage is given by:

$$V2 = (VE/n2)*(\delta/\delta')$$

where VE is the input voltage to the converter, n2 is the turns ratio between the primary winding and the secondary winding that forms the regulated auxiliary output, $\delta$ is the quotient obtained by dividing the conductive period of the first MOSFET by the total period, and $\delta'$ is the quotient obtained by dividing the conductive period of the second MOSFET by the total period, taking into account the current flowing in a parasitic diode of the second MOSFET.

The multi-output converter of the invention regulates the main output and one of the auxiliary outputs by means of the pulse width of the duty cycles of the two MOSFETs, the switching frequency remaining fixed. The filters for electromagnetic interferences are simpler to design and, finally, the converter efficiency is high since the regulating technique used is non-dissipating.

BRIEF DESCRIPTION OF THE DRAWINGS

FIG. 3 shows another possible arrangement of the second switching device in parallel with the first switching element, and FIGS. 4A and 4B respectively show the waveforms of the switching signals of the two MOSFETs.

DETAILED DESCRIPTION

Figure 1:
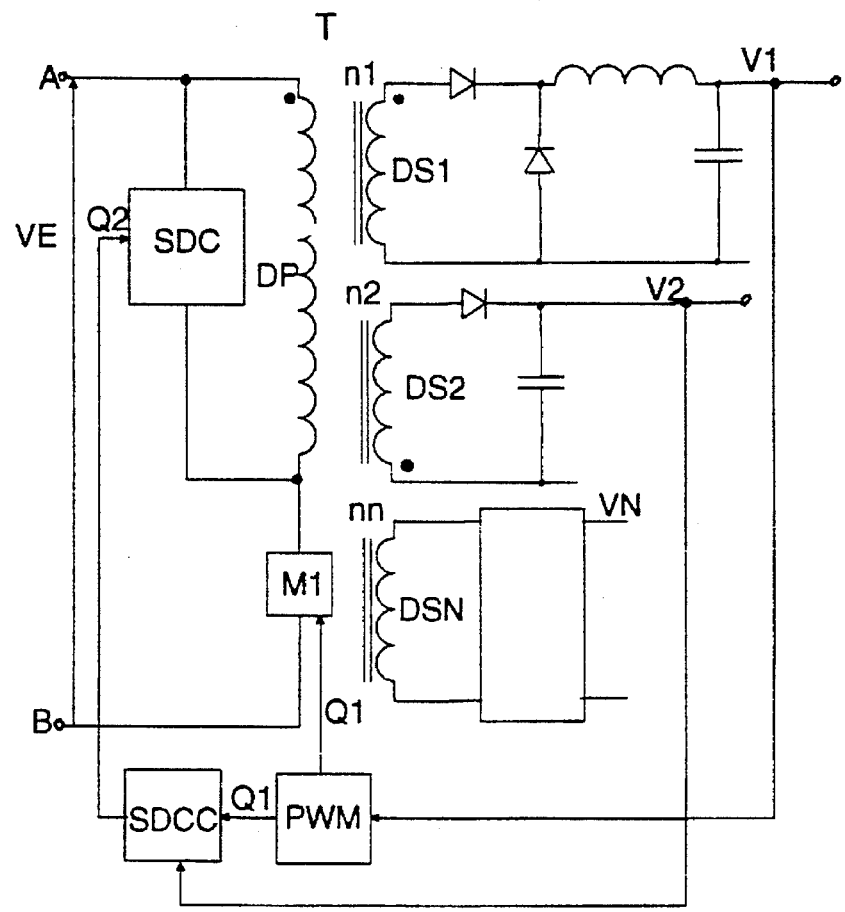
FIG. 1 shows a block diagram of a multi-output DC/DC power converter according to the invention.

The multi-output converter of the invention, see FIG. 1, transforms an input voltage signal VE into several output voltages V1,...,VN. The number of outputs is exactly the same as the number of secondary windings DS1,...,DSN in the transformer T. One winding of the transformer T is the main winding and the other windings are auxiliary windings. Both the main output and one of the auxiliary outputs are regulated.

Figure 2:
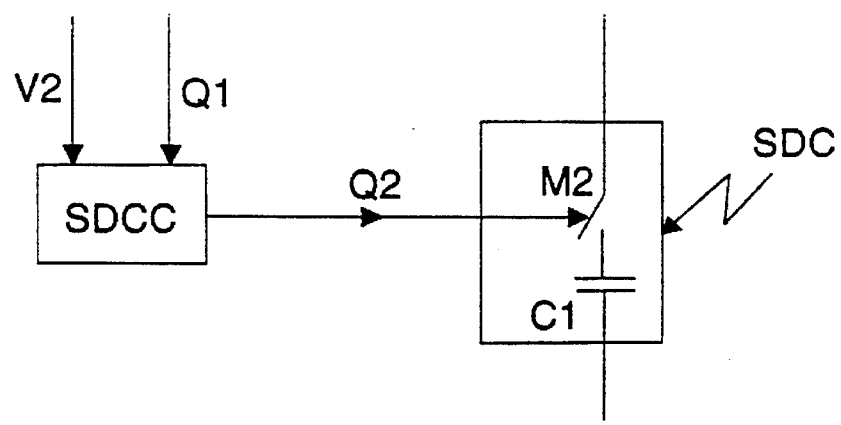
FIG. 2 shows an implementation of the second switching device in which the switching is controlled by a second switching control device, all in accordance with the invention.

The converter primary circuit comprises the primary winding DP of the transformer T connected in series with the drain of a first MOSFET M1 the switching of which is controlled by a first switching control device PWM, a pulse width modulator, by means of a first switching control signal Q1 that is applied to the gate of the MOSFET M1. In addition, the primary circuit includes a second switching device SDC, see FIG. 2, which includes a second MOSFET M2 whose source is connected to a capacitor C1, the other terminal of this capacitor C1 being connected to the drain of the MOSFET M1. Also, the drain of the second MOSFET M2 is connected to the input node A of the converter, to which is connected the primary winding DP of the transformer T.

The switching of the second transistor MOSFET M2 is controlled by a second switching control device SDCC that generates a second switching control signal Q2 that is applied to the gate of said MOSFET M2.

The first MOSFET M1 alternatively connects the primary winding DP of the transformer T to the input voltage signal VE, which is applied across the input nodes A, B of the converter. During the conductive period of the first MOSFET M1, a current flows through the primary winding DP producing the transfer of energy into a secondary winding DS1, this secondary winding DS1 comprising the main output of the converter.

As shown in FIG. 4, the transformer T stores energy during the conductive period TON1 of the first MOSFET M1 and releases this stored energy into a secondary winding DS2 during the cut-off period TOFF1 of MOSFET M1. This secondary winding DS2 works in a discontinuous mode, that is, the current in this secondary winding reaches zero value during part of the cut-off period TOFF1 of the first MOSFET M1 and, moreover, this cut-off period TOFF1 of the first MOSFET M1 is longer than the conductive period TON2 of the second MOSFET M2 (see FIG. 4).

Consequently, by controlling the time of conduction of the second MOSFET M2 the voltage of one of the auxiliary outputs of the converter is regulated.

To achieve this, the second switching control device SDCC generates the second switching control signal Q2 as a function of the voltage signal V2 that is regulated and of the first switching control signal Q1.

FIG. 3 shows another possible configuration of the multi-output converter, in which the second switching control device SDCC is connected in parallel with the first MOSFET M1, in such a way that the drain of the second MOSFET M2 is connected to the drain of the first MOSFET M1 and the terminal of the capacitor C1 is connected to the source of the first MOSFET M1.

The converter works in a similar manner to the previous case.

What is claimed is:

1. A converter device that transforms an input voltage (VE) into several output voltages (V1, ... ,VN) comprising a transformer (T) with a primary winding (DP) and a number of secondary windings (DS1, ... ,DSN), a first switching element (M1) connected in series with said primary winding (DP) constituting a primary circuit and a first switching control device (PWM) which generates a first switching control signal (Q1) to control the switching of said first switching element (M1), further comprising a second switching device (SDC) inserted in the primary circuit, a second switching control device (SDCC) that generates a second switching control signal (Q2) as a function of the first switching control signal (Q1) and of a second output voltage (V2), said second switching control signal (Q2) variably controlling the switching of the second switching device (SDC) by varying an ON state of the second switching device (SDC) when the first switching element (M1) is in an OFF state.

2. The converter device according to claim 1, wherein the second switching device (SDC) comprises a second switching element (M2) connected in series with a capacitor (C1).

3. The converter device according to claim 2, wherein the second switching control device (SDCC) comprises a control logic process such that the second switching element (M2) is in a cut-off state (TOFF2) prior to a conducting state (TON1) of the first switching element (M1), remaining in this cut-off state (TOFF2) during the conductive period (TON1) of the first switching element (M1) and enters a conductive period (TON2) after the conductive period (TON1) of the first switching element (M1).

4. The converter device according to claim 3, wherein the conductive state (TON2) of the second switching element (M2) is less than the cut-off period (TOFF1) of the first switching element (M1).

5. The converter device according to claim 2, wherein the second switching device (SDC) is connected in parallel with the primary winding (DP) of the transformer (T).

6. The converter device according to claim 2, wherein the second switching device (SDC) is connected in parallel with the first switching element (M1).

* * * * *